Dec. 10, 1957    J. C. RHODES ET AL    2,815,660
CONTINUOUS VAPOR PRESSURE DETERMINATION
Filed Sept. 9, 1953    3 Sheets-Sheet 1

INVENTORS:
Joseph C. Rhodes
John P. Segers
BY
Everett A. Johnson
ATTORNEY

INVENTORS:
Joseph C. Rhodes
John P. Segers
BY Everett A. Johnson
ATTORNEY

United States Patent Office 2,815,660
Patented Dec. 10, 1957

2,815,660

CONTINUOUS VAPOR PRESSURE DETERMINATION

Joseph C. Rhodes, Park Forest, and John P. Segers, Crete, Ill., assignors to Standard Oil Company, Chicago, Ill., a corporation of Indiana Application September 9, 1953, Serial No. 379,276

15 Claims. (Cl. 73—53)

This invention relates to an improved apparatus and method for automatically determining the volatility characteristics of flowing liquids. It has particular reference to apparatus that will automatically and continuously determine the vapor pressure of a liquid and will indicate or record the vapor pressure of a continuously flowing sample.

Still more specifically, the invention relates to the continuous monitoring of the vapor pressure of casing head crude which is blended into a crude pipe line for transport from the field to the refinery. At the refinery it is desired to separate the light casing head gasoline from the heavier crude and this invention enables one to identify the beginning and end of the blended crude. The apparatus is also intended for use in the blending operation at the inlet end of the pipe line system. Thus, the product before it is introduced into the pipe line is sampled and tested to determine its vapor pressure and, since there is no loss of vapor pressure in transport, the blended product can be identified at the terminal of the pipe line.

It has heretofore been proposed that the vapor pressure of liquid be determined automatically by withdrawing a sample continuously from a reservoir or pipe line and thereafter measuring the pressure exerted by the vapor of the liquid at a controlled constant temperature. However, considerable difficulty has been encountered in devices of this type primarily because they permit the accumulation of fixed gases within the apparatus and, therefore, the determinations become invalid because a large part of the measured pressure soon becomes that of the accumulated gases. To avoid such difficulties, systems have been devised which are satisfactory for use on gasolines and the like, but many such devices include small openings and moving parts which, when used on crude oil, have not been satisfactory. It appears that crude oil lays down a wax-like deposit which causes plugging of small openings such as capillaries and needle valve seats.

It is, therefore, a primary object of this invention to provide an instrument which overcomes these difficulties with crude oil and which has no small openings and no moving parts within the test chamber.

Another difficulty with prior art devices is the length of time necessary to give a response. In pipe line monitoring, response time is more important than accuracy and, accordingly, it is an important object of this invention to provide a mechanism which has a very short response time.

A further object of the invention is to provide an improved continuous vapor pressure determining apparatus adapted for use on crude oils whereby the problem which has previously existed in the accumulation of fixed gases and in the fouling of such gases are substantially and entirely eliminated. A more specific object of the invention is to provide an apparatus adapted to determine the presence of volatile constituents in crude oil.

An additional object of the invention is to provide a system where sampling and testing can be effected without contamination or loss of product. More specifically, it is an object of the invention to provide an apparatus to permit the continuous return of the sample to the pipe line under pressure. These and other objects of the invention will become apparent as the description thereof proceeds.

Briefly stated, the present invention contains these objects by means of an apparatus including a first pump which discharges crude oil through a preheater chamber into a vaporization chamber. The level of liquid in the chamber is maintained by a standpipe which feeds into a second pump. The second pump, like the first pump, is a positive displacement pump, but is set to transfer fluids from the vaporization chamber at a higher rate than the introduction of liquid thereinto by the first pump. Thus, during part of its stroke the second pump will carry off some vapors from above the liquid level in the vaporization chamber. This removal of vapor serves the purpose of continuously scavenging relatively fixed gases and of continuously removing a minor portion of the vapors. The pressure, due to the vapors in the chamber, is measured and is correlated with Reid Vapor Pressure.

Our invention will be described in greater detail with respect to the accompanying drawings wherein:

Figure 1 is a diagrammatic sketch, partly in section, of an automatic vapor pressure apparatus according to the invention;

Figure 4 is a schematic diagram of a pipe line system utilizing the apparatus of Figures 1 to 3.

Figure 2:
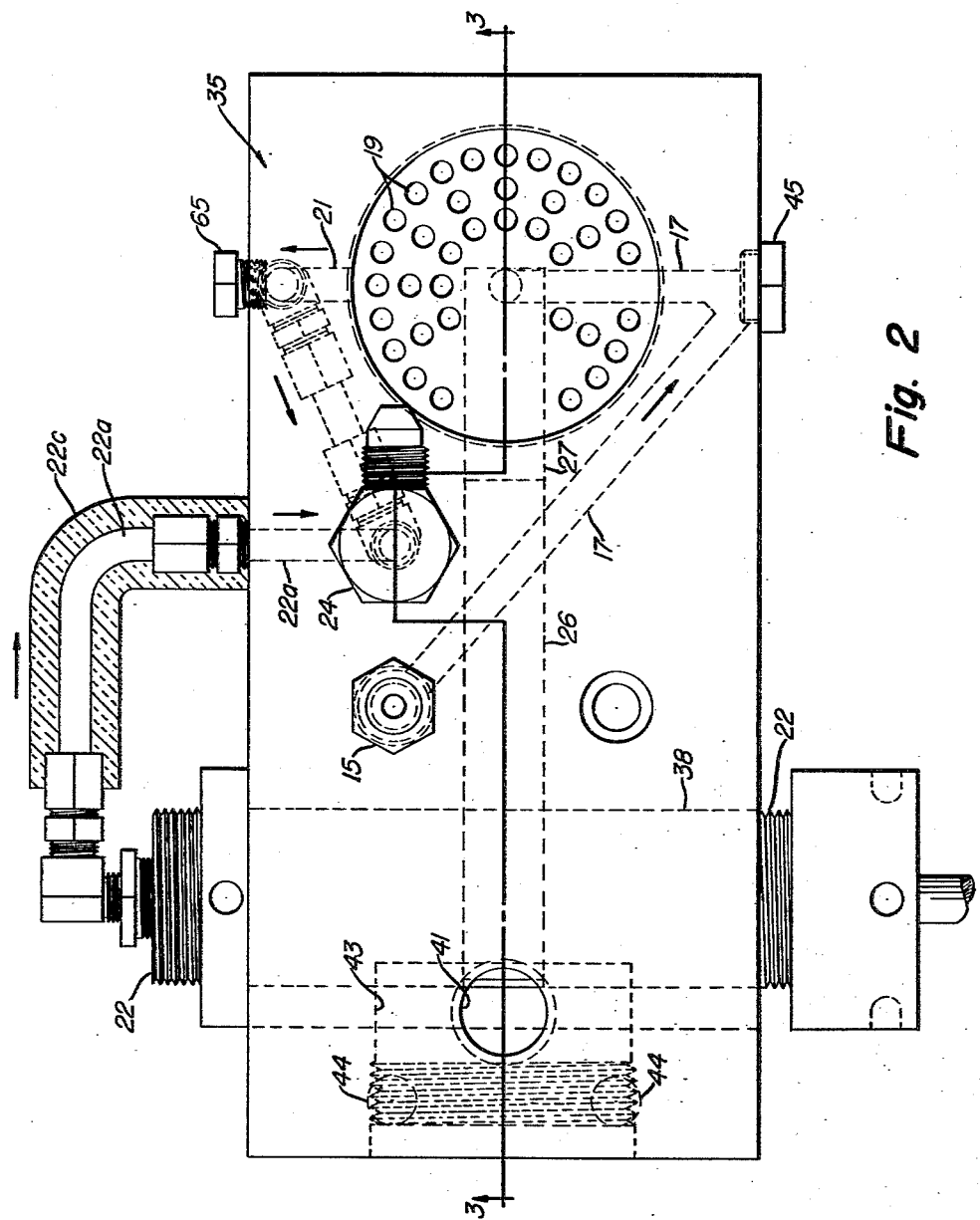
Figure 2 is a top exterior view (with some parts removed) of an installation embodying the principles of Figure 1.
Figure 3:
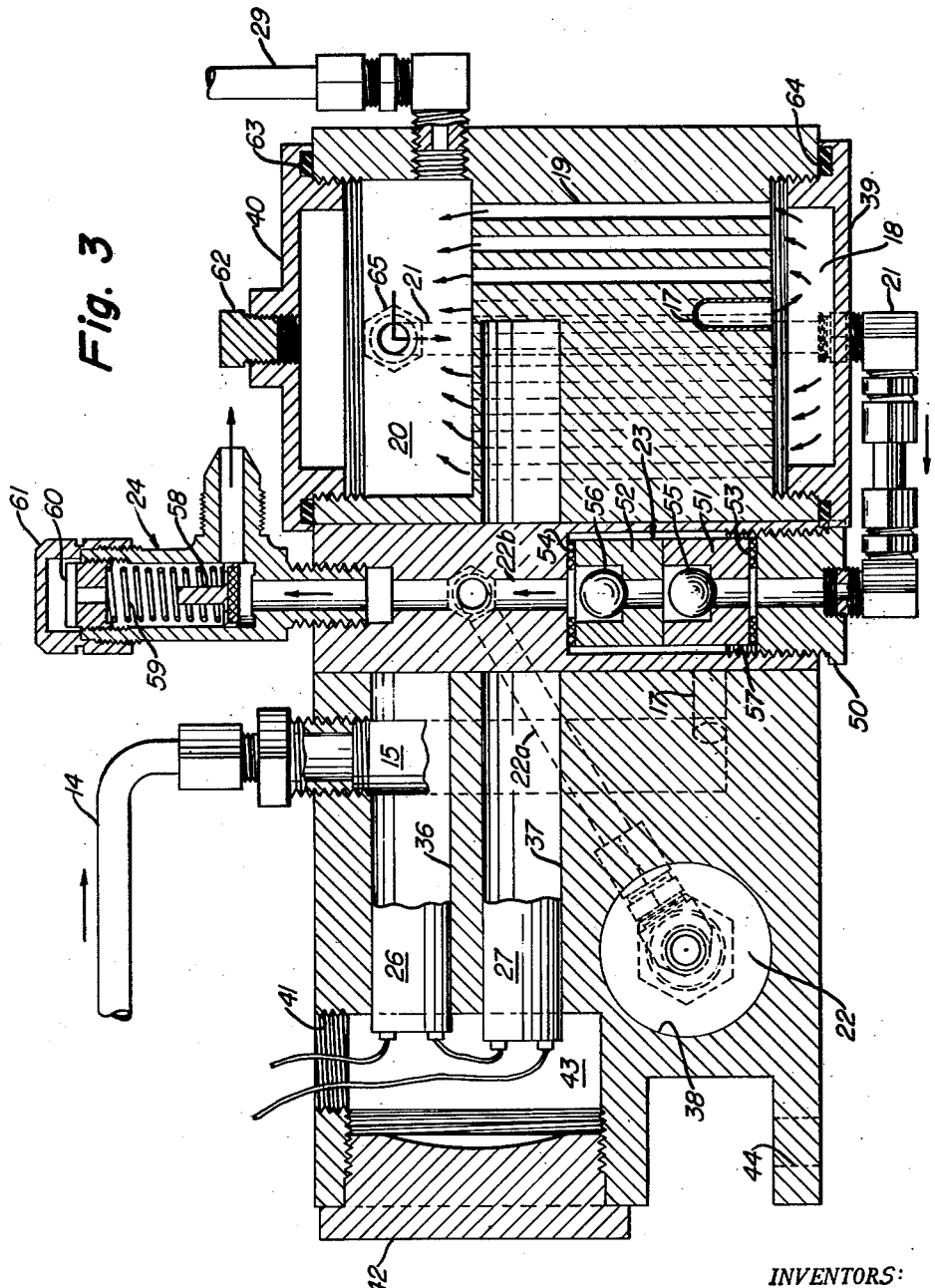
Figure 3 is a section taken along the lines 3—3 in Figure 2.

Referring to Figure 1, the sample from a source, such as a pipe line, is introduced to the system by line 10 through check valve 11 under the action of proportioning pump 12. On the pumping stroke of pump 12, the sample is ejected from the pump chamber and passed through the body of relief valve 13 into transfer line 14. The sample introduced by line 14 passes through the preheater 15 which is within the temperature controlled zone 16. This may be a temperature controlled bath or a thermostated metal block as shown in Figures 2 and 3. The zone 16 is maintained at the desired temperature (for crude oils this is at a temperature of about 140° F. ±10° F.) by means of heater 27 which is controlled by thermoswitch 26 or its equivalent.

The preheated sample then flows via line 17 into the bottom manifold 18 of the heat exchanger 19 and upwardly through the heat exchanger 19 into a pressure chamber 20 wherein a preselected depth and volume of liquid is maintained by means of the overflow standpipe 21.

A second proportioning pump 22, similar to pump 12, is adapted to pump a volume of fluids which is somewhat larger than that introduced by pump 12. A suitable motor 30 and linkage 31—32 are provided in a conventional manner for the actuation of the pumps 12 and 22. Thus, on the suction stroke of pump 22 the check valve 23 opens and fluids are withdrawn from separation chamber 20 via overflow line 21 into the pump 22. The fluids withdrawn from 20 comprise liquids until the desired liquid level has been reached as determined by the overflow 21 after which time a portion of the vapors above the liquid level is also withdrawn by the pump 22. On the pumping stroke of pump 22 the vapors and liquids, withdrawn from the pressure chamber 20 as described, are ejected from the system through relief valve 24 and enter line 25 for return to the pipe line (not shown) at above pipe line pressure.

A pressure recorder 28, which may be calibrated in terms of Reid Vapor Pressure directly, is connected by line 29 to the pressure chamber 20 below the liquid level determined by the overflow standpipe 21. Connection with the liquid phase within chamber 20 minimizes fluctuations in pressure indications due to the pump action. It also gives a very quick response to changes in vapor pressure of flowing liquids under test by avoiding accumulation of volatile condensate in the pressure-sensing system which volatile condensate would later be vaporized to give false readings with subsequent samples of lower actual vapor pressure. Accordingly, the pressure-sensing system is always filled with liquid which has a vapor pressure at least as high as any sample passing through the equipment.

In Figures 2 and 3 we have illustrated in more detail an embodiment of the invention wherein the preheater 14, the heat exchanger 19, pressure chamber 20, standpipe 21, pump 22, pump discharge line 22a, and relief valve body 24 are all within a thermostated block 35. Cavities 36 and 37 accommodate the thermoswitch 26 and the heater 27, respectively. The pump 22 is accommodated by transverse bore 38. The manifold 18 and the pressure chamber 20 are enclosed by plates 39 and 40, respectively. The electrical leads for thermoswitch 26 and heater 27 emerge from the block 35 by means of port 41 having a threaded opening for sealing. A plug 42 encloses the chamber 43 which communicates with the cavities 36 and 37 as shown in Figure 3. A plurality of bores 44 are adapted to engage bolt means for anchoring the block 35 which, incidentally, may be insulated (by means not shown) to minimize thermal losses. The exterior portion of the pump discharge line 22a is shown as enclosed by heat insulation 22c, but line 22a may be channels in the block 35 similar to channel 17.

Referring to transfer line 17, it comprises a channel in block 35 communicating with the manifold 18 of the heat exchanger 19 and the preheater 15. A plug 45 closes the ends of the two bores which form the channel 17.

The operation of the thermostated block instrument of Figures 2 and 3 is similar to that described with respect to the schematic showing of Figure 1. The sample is introduced via line 14, this line being a discharge line from relief valve 13 and pump 12 as shown in Figure 1. The preheated liquid flows under pressure of pump 12 through channel 17 into the bottom manifold 18 of the heat exchanger 19 comprising a plurality of parallel bores which may be approximately ⅜ inch in diameter. The block 35 is suitably made of aluminum with overall dimensions of about 8.375 x 4 x 4 inches. The chamber 20 is about 2.5 inches in diameter and about 0.75 inch high providing a pool of liquid having a depth of about 0.5 inch. The chamber 20 is sealed by the threaded closure plate 40 together with the O-ring gasket 63. If desired, the plate 40 may be provided with a drilled and tapped port 62 for convenience in determining temperatures within the vaporization chamber 20.

The check valves 11 and 23 are of similar construction and include a cap 50, a pair of seats 51 and 52, gasket 53 and gasket 54, and ball checks 55 and 56 to complete the assembly. As shown in Figure 3, the bottom cap 50 is threaded into a bore 57 which accommodates the check valve assembly as described. Upon the suction stroke fluids from the check valve assemblies flow into the chambers 12b and 22b and a portion is withdrawn via conduits 12a and 22a into the pumps 12 and 22, respectively. On the pumping stroke, the check valves 11 and 23 close and fluids are displaced from 12b and 22b through the relief valve 13 or 24. These relief valves are of the spring-loaded poppet valve type having the valve plug 58 and spring 59, the tension of which is controlled by adjusting the plug 60 within the cap 61.

The principal components and methods of operation involves the metering of the liquid into a thermostated block 35 by means of a proportioning pump 12. The liquid flows into the chamber 20 by way of the manifold 18 and thence upwardly through the array of small parallel holes 19. From the chamber 20 the liquid flows through overflow pipe 21 into the check valve assembly 23 and into a second proportioning pump 22. This pump 22 forces the liquid through the relief valve 24 which is set to relieve at a pressure in excess of the highest vapor pressure expected in the chamber 20. Thus, no liquid or vapors can escape through the relief valve 24 without having been forced out by the pump 22. The system is thus sealed or enclosed and the pressure within the upper manifold chamber 20 is the vapor pressure of the liquid at the temperature of the block 35.

The temperature of the block 35 is controlled by means of the heater 15 and the thermoswitch 26. The pump rate of the second pump 22 is set at a higher rate than the first pump 12 and this can be done by adjusting the length of the stroke in either pump as is well known. The entire assembly, including the preheater 15, the chamber 20, the check valve assembly 23, pump 22, and the body of the relief valve 13 fixed to the pump discharge 22a are within the thermostated block 35 or are insulated to prevent thermal losses.

Our apparatus may be employed in pipe line operation for the transport of relatively high boiling crude and low boiling casing head gasoline. One such system is illustrated in Figure 4 wherein casing head gasoline in line 70 is blended with crude oil in line 71. A stream of blended liquid is diverted by line 72 at a uniform rate into a vapor pressure monitoring apparatus 73 such as illustrated by Figure 1, wherein the vapor pressure is measured. The blended casing head and crude are pumped through pipe line 74 to a terminal station 75 where a sidestream sample of pipe line liquid is continuously withdrawn from the pipe line 74 via line 76 and introduced into a second vapor pressure monitoring apparatus 76, similar to apparatus 73, wherein the vapor pressure of the pipe line liquid is continuously monitored to detect the arrival of casing head being pumped through the pipe line 74.

Although we have described our invention in terms of examples which are set forth in some detail, it should be understood that these are by way of illustration only and that our invention is not limited thereto because alternative embodiments will become apparent to those skilled in the art in view of our description of the invention. Accordingly, modifications in our invention are contemplated without departing from the spirit thereof.

What we claim is:

1. A vapor pressure monitoring device comprising a first pump, a heat exchanger means including a preheater into which said pump discharges, means for maintaining said heat exchanger means at a predetermined controlled temperature, a fluid reservoir superposing said heat exchanger, an overflow outlet from said reservoir below the top thereof and comprising the sole outlet therefrom, a second proportioning pump operating at a greater capacity than said first pump taking suction from said overflow outlet, valve means interposed said second proportioning pump and said outlet, and a pressure-responsive means communicating with said reservoir at a point therein below said overflow outlet.

2. A vapor pressure monitoring device comprising a first pump, a preheater into which said pump discharges, a heat exchanger of the tubular type, a conduit between said preheater and said heat exchanger, a fluid reservoir at a level above said heat exchanger, an overflow outlet from said reservoir below the top thereof and comprising the sole outlet therefrom, a second proportioning pump operating at a greater capacity than said first pump taking suction from said overflow outlet, a check valve interposed said second proportioning pump and said outlet, a relief valve adapted to close on suction by said second pump and to open on a pumping stroke of said second pump, means for maintaining said reservoir, heat exchanger, and said second pump at a predetermined and controlled temperature, and a pressure-responsive means communicating with said reservoir at a point therein below said overflow outlet.

3. A vapor pressure monitoring device for use on crude oil containing blended low boiling components which comprises in combination a first pump means, a second pump means, a heat exchanger means including a vapor separation chamber interposed said first pump means and said second pump means, a single outlet from said heat exchanger means for maintaining a free liquid surface in said heat exchanger means, said first pump means discharging to said heat exchanger means and said second pump means taking suction from said vapor separation chamber, a pressure-responsive means in communication with said heat exchanger means, and a constant temperature means enclosing said heat exchanger and said second pump means, said second pump means being adapted to withdraw a larger volume of fluid from said heat exchanger means than delivered by said first pump means.

4. A vapor pressure monitoring device for use on crude oil containing blended low boiling components which comprises in combination a first pump means, a second pump means, a heat exchanger means including a vapor separation chamber interposed said first pump means and said second pump means, an overflow outlet below the top of said heat exchanger means, said overflow outlet comprising the sole fluid outlet from said heat exchanger means and being adapted to maintain a free liquid surface at the level of said outlet, said first pump means discharging to said vapor separation chamber and said second pump means taking suction from said heat exchanger means through said overflow, said second pump means being adapted to withdraw a larger volume of fluid from said heat exchanger means than delivered by said first pump means, a pressure-responsive means in communication with said heat exchanger means, and a constant temperature means enclosing said heat exchanger means and said second pump means.

5. An apparatus useful in determining the vapor pressure of blended hydrocarbon liquids which comprises a positive displacement feed pump, a thermostated metal block containing a heat exchanger into which said pump discharges and a vapor pressure chamber into which said exchanger discharges, an overflow outlet communicating with the vapor pressure chamber intermediate the top and bottom thereof, said outlet providing the only means of egress from said chamber, a second displacement feed pump in communication with the said outlet and in said block, said second pump being adapted to be operated at a higher suction rate that the delivery rate of said first feed displacement pump, and a pressure gauge in communication with a low point in said vapor pressure chamber.

6. An apparatus for vapor pressure testing which comprises a positive displacement feed pump, a thermostated metal block containing a heat exchanger into which said pump discharges, a vapor separation chamber in said block into which said exchanger discharges, a liquid overflow outlet communicating with the said vapor separation chamber, a second displacement feed pump in communication with the said outlet and adapted to be operated at a higher suction rate than the delivery rate of said first feed displacement pump, and a pressure gauge in communication with said vapor separation chamber at a level below the inlet of said overflow outlet.

7. An apparatus for determining the vapor pressure of mixed hydrocarbon liquids which comprises a positive displacement feed pump, a thermostated metal block, said block containing a heat exchanger means, a vapor separation chamber in said heat exchanger means, a liquid overflow standpipe communicating with the said vapor separation chamber and comprising the outlet from said exchanger means, and a second displacement feed pump taking suction from said standpipe, said second pump being adapted to be operated at a higher rate than said first feed pump, and a pressure gauge in communication with said vapor separation chamber below the inlet to said standpipe.

8. An apparatus for determining the vapor pressure of mixed hydrocarbon liquids which comprises a thermostated metal block containing a heat exchanger means, a positive displacement feed pump discharging into said heat exchanger means, a vapor pressure chamber superposing said exchanger means, a standpipe communicating with the vapor pressure chamber to maintain a liquid level therein, and a second displacement feed pump taking suction from said standpipe, said second pump being adapted to be operated at a higher rate than said first feed pump, and a pressure gauge operatively connected to said vapor pressure chamber below the liquid level therein.

9. A vapor pressure monitoring device for use on crude oil mixtures which comprises in combination a first pump means, a vaporization chamber means into which said first pump means discharges, a second pump means taking suction from said vaporization means at a level intermediate the top and bottom thereof providing a vapor space above said level, said vaporization chamber means being adapted to accumulate a pool of liquid in the lower part thereof, a pressure-responsive means in communication with said lower part of said vaporization chamber means, and a constant temperature means enclosing said vaporization chamber means and said second pump means, the temperature of said vaporization chamber means and of said second pump means being maintained uniform by said constant temperature means and said second pump means delivering a larger volume of fluid than said first pump means.

10. A system for monitoring the vapor pressure of relatively high boiling hydrocarbon liquids having blended thereinto a quantity of relatively low boiling constituents which comprises a vaporization chamber, pump means for introducing a liquid stream at a first rate into said vaporization chamber, means for adding heat to the liquid in said vaporization chamber at a uniform temperature level, second pump means for withdrawing a combined stream of liquid and vapor from a point in said vaporization chamber at about the level of the liquid in said chamber and at a rate higher than said first rate, and means for sensing pressure changes in said vaporization chamber as an indication of changes in vapor pressure of the introduced liquid.

11. A system for continuously determining the vapor pressure of liquids which comprises a vaporization chamber, pump means for continuously introducing a metered portion of a liquid into said vaporization chamber, outlet means in said chamber for maintaining a pool of uniform volume of liquid therein at a uniform depth, means for maintaining said pool at a substantially constant temperature below the critical temperature of the liquid, pump means for withdrawing a combined stream of liquids and vapors from said outlet means at a metered volumetric rate higher than said first metered rate and sufficient to prevent the accumulation of non-condensible gases above said pool, and means for measuring the pressure exerted by the vapors on said pool in said vaporization chamber during said withdrawal of fluids therefrom.

12. A system for continuously determining the vapor pressure of liquids which comprises means for continuously introducing a metered portion of a liquid into a closed vaporization chamber, outlet means for maintaining in said chamber a pool of liquid of uniform depth and a mass of vapors of uniform volume, means for continuously maintaining said pool and said mass at a substantially constant temperature, means for withdrawing vapor and liquid from said outlet means in a single stream at a metered volumetric rate higher than said first metered rate thereby simultaneously withdrawing liquid and venting vapors therefrom, and means for measuring the pressure exerted by the vapors on said pool in said vaporization chamber.

13. An apparatus for identifying flowing volumes of crude oil containing identifiable proportions of blended casing head gasoline which comprises means for flowing a liquid stream of crude oil containing such casing head gasoline at a first uniform rate into a vaporization chamber, outlet means for maintaining a free liquid surface at a constant level in said chamber, means for adding heat to said stream within said chamber whereby low boiling constituents are vaporized therein, means for continuously withdrawing fluids including casing head vapors and unvaporized crude from said outlet means in a single stream at a volumetric rate greater than the volumetric rate of introduction of said liquid stream into said chamber, and means for continuously measuring the vapor pressure within said chamber, sudden increases in vapor pressure identifying the presence of a crude oil flow containing blended casing head gasoline.

14. A system for continuously determining vapor pressure characteristics of a flowing liquid stream which comprises means for continuously withdrawing an aliquot portion of said stream at a constant predetermined rate to provide a sample liquid stream, means for passing said sample liquid stream through a heat exchanger maintained at a constant temperature for bringing said stream to a predetermined temperature, means for introducing said liquid stream at said predetermined temperature into a liquid-vapor separation chamber which is also maintained at said constant temperature, outlet means for maintaining a substantially constant liquid level in said separation chamber and pump means for withdrawing vapors through said outlet means from said separation chamber above said liquid level, the combined rate of withdrawal of said liquid and said vapor through said outlet means being higher than the volumetric rate of introduction of liquid and sufficient to prevent accumulation of non-condensible gases in the separation chamber, and means for measuring the pressure exerted on the liquid in the vapor separation chamber as a measure of the said vapor pressure.

15. Pipe line apparatus for the transport of a stream of relatively high boiling crude and low boiling casing head gasoline which comprises means for blending casing head gasoline with crude oil and determining the vapor pressure of the blended casing head gasoline including means for introducing a stream of blended liquid at a uniform rate into a vaporization chamber, means for maintaining said vaporization chamber at a uniform temperature, outlet means for maintaining a pool of said blended liquid in said chamber, means for pumping a single stream of fluids from said vaporization chamber through said outlet means at a higher rate than the rate of introduction of liquid into said chamber, means for measuring the vapor pressure in said vaporization chamber, means for pumping the blended casing head crude to a terminal station, means for continuously withdrawing a sidestream sample of pipe line liquid at said terminal station, means for introducing the withdrawn sample into a second vaporization chamber at said uniform rate, means for maintaining said second vaporization chamber at said uniform temperature, outlet means for maintaining a pool of the sample in said chamber, second pump means for withdrawing a single stream of fluids from said second vaporization chamber through said outlet means at a uniform volumetric rate higher than said rate of introduction of liquid into said second vaporization chamber, and means for continuously monitoring the vapor pressure within the said second vaporization chamber to detect the arrival of the blended casing head and crude pumped through said pipe line from a point remote from said station.

References Cited in the file of this patent
UNITED STATES PATENTS

| | | |
|---|---|---|
| 2,119,786 | Kallam | June 7, 1938 |
| 2,122,762 | Smith | July 5, 1938 |